A. TRIVIGINO.
TWITCH.
APPLICATION FILED APR. 22, 1916. RENEWED MAR. 12, 1917.
1,243,118.
Patented Oct. 16, 1917.
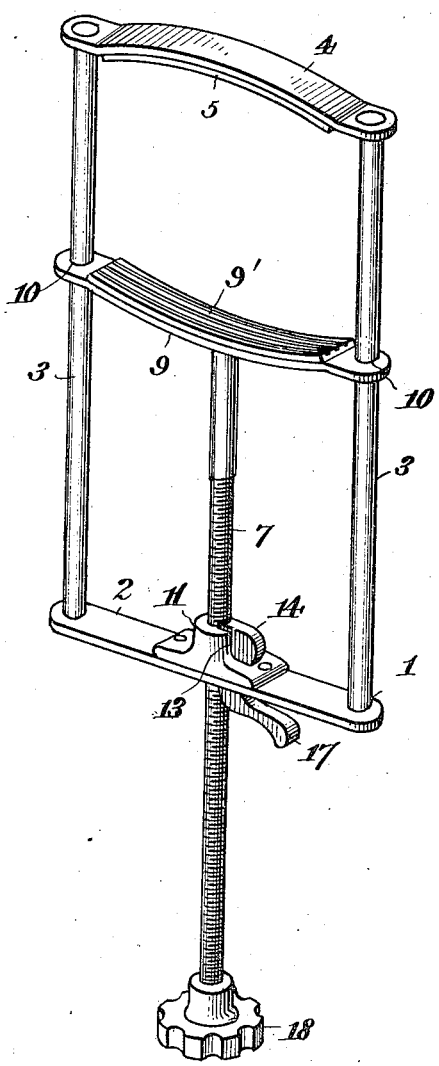
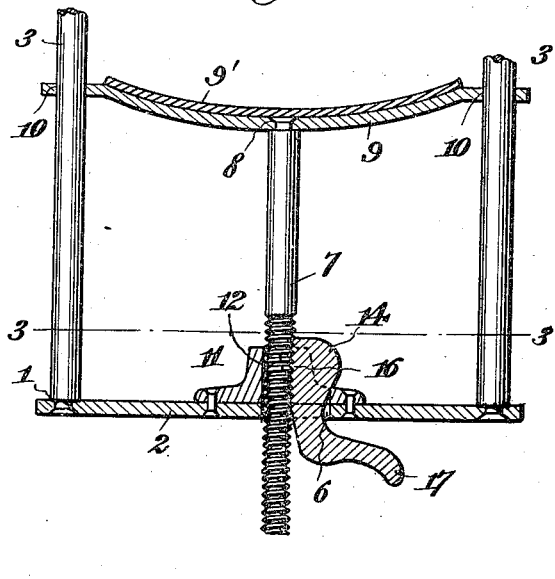
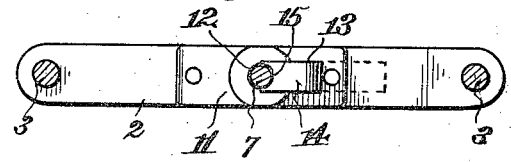
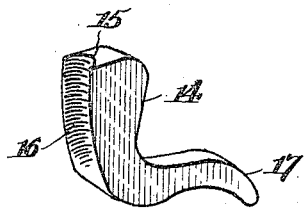
Witnesses:
Anna V. Doyle.
Inventor,
Anthony Trivigino.
By Victor J. Evans,
Attorney.

UNITED STATES PATENT OFFICE.

ANTHONY TRIVIGINO, OF BROOKLYN, NEW YORK.

TWITCH.

1,243,118.  Specification of Letters Patent.  Patented Oct. 16, 1917.

Application filed April 22, 1916, Serial No. 92,940. Renewed March 12, 1917. Serial No. 154,337.

*To all whom it may concern:*

Be it known that I, ANTHONY TRIVIGINO, a citizen of the United States, residing at Brooklyn, in the county of Kings and State of New York, have invented new and useful Improvements in Twitches, of which the following is a specification.

This invention relates to twitches, and it consists of the novel construction and arrangement of parts hereinafter fully described and claimed.

An object of this invention is to produce a device of the character mentioned which comprises a frame consisting of an end plate, guide rods connecting the end plate with what I will term a fixed lip engaging member. Movable on the guide rods is a second lip engaging member with which a threaded stem is turnably correlated. The end plate is provided with an opening about which, is arranged a block having a groove therein. The mentioned block is secured to the end plate. A wedge is also arranged in the opening in said end plate and is freely movable therein. The wedge is provided with a groove which has threads, the purpose of which will be hereinafter fully explained. The wedge is also provided with a tail for the manipulation thereof.

Figure 1, is a perspective view of my improved twitch.

Fig. 2, is a fragmentary vertical sectional view thereof.

Fig. 3, is a sectional view taken on the line 3—3 in Fig. 2.

Fig. 4, is a perspective view of the wedge detached.

Referring now to the drawing in detail the numeral 1, designates a frame which consists of an end plate 2, guide rods 3, which connect the end plate 2, with what is termed the fixed lip engaging member 4.

The lip engaging member 4, is of arcuate formation as shown and it has attached thereto in any suitable manner a pliant pad 5. The numeral 6, designates an opening in the end plate 2, through which is extended a threaded stem 7, turnably connected as at 8, with a movable lip engaging member 9. The said member 9, is also of an arcuate formation and is provided with apertures 10, for the reception of the guide rods 3. A pliant pad 9', is attached to member 9, in any suitable manner.

A guide block 11, is riveted to the end plate 2, and is provided with a bore 12, which receives the threaded stem 7. The guide block is also provided with a recess 13, which communicates with the bore 12, and freely movable in the recess 13, is a wedge 14, having a groove 15, which is provided with screw threads 16, for engagement with the threads of the stem 7. The wedge 14, has a tail 17. It will be noticed that the boss or major portion of the guide block 11, is at one side of the threaded stem 7, and the bore 12, which is more in the nature of a groove after the recess 13, is made, is plain or unthreaded and nicely receives the threaded stem 7, whereas the wedge 14, is arranged in the recess 13, at the opposite side of the boss of the guide block, and the groove therein with the threads 16, are engageable with the threads of the stem 7. The tail 17, of the wedge extends below the end plate 2, in the normal active position of the wedge.

It will be apparent from the drawings that the correlated guide block and wedge coöperate in a manner that the sliding of the threaded stem in one direction is in no way affected by the presence of the wedge, as the wedge, when the stem is being slid, rides upwardly and away from the stem, thereby permitting the free movement of the stem. The groove of the guide block 11, as stated is plain or unthreaded and in no way affects the movement of the stem, but in reality, it is in the nature of a guide as it nicely fits or accommodates the stem. It would also be understood that the twitch may be easily applied without undue cruelty to a horse on which it is intended to be used to deprive such animal of the control of its upper lip so that medical treatment may be administered. The twitch being also useful for the proper handling of the horse while being shod or combed and cleaned.

The correlated guide block and wedge form the essential parts of the twitch, in that the threaded stem 7, may be slid for the quick adjustment of the lip engaging member 9, which is carried by said stem, any gradual adjustment of the member 9, may be accomplished by the rotation of the stem 7. A knurled knob 18, on the free end of the stem 7 may be manipulated for the rotation thereof. While the stem 7, is being slid for the quick adjustment, the wedge 14, rides upwardly in the recess 13, away from the stem 7, and immediately upon the release of the knob 18, the wedge 14, is caused to fall back into the said recess 13, to securely hold the stem against further movement. The downward movement of the stem results from the expanding by the horse of the muscular fibers of the lip against the member 9. It will be therefore understood that it would be well nigh impossible for the horse to remove the twitch.

What is claimed as new is:—

In an article of the class described consisting of a frame having an end plate and guide rods, a fixed arcuate lip engaging member at the ends of said guide rods, a second arcuate lip engaging member movable on said guide rods, a threaded stem turnably connected with said second mentioned lip engaging member, an opening in the end plate, a block arranged about said opening and secured to the end plate, the said block having a groove and a recess; the said stem being received in the groove in said block, a wedge freely movable in the recess at one side of the threaded stem, there being a groove in the wedge, said groove being provided with screw threads for engagement with the threads on the stem, as and for the purpose specified.

In testimony whereof I, hereby affix my signature in presence of two witnesses.

ANTHONY TRIVIGINO.

Witnesses:
JOHN P. WAGNER,
ANNA V. DOYLE.